United States Patent [19]
Hippenmeyer et al.

[11] Patent Number: 5,481,096
[45] Date of Patent: Jan. 2, 1996

[54] BAR CODE READER AND METHOD FOR ITS OPERATION

[75] Inventors: Heinrich Hippenmeyer, Freiamt; Reinhold Kilian, Waldkirch, both of Germany

[73] Assignee: Erwin Sick GmbH Optik-Elektronik, Waldkirch, Germany

[21] Appl. No.: 325,974

[22] Filed: Oct. 20, 1994

[30] Foreign Application Priority Data

Oct. 22, 1993 [DE] Germany .......................... 43 36 137.4

[51] Int. Cl.⁶ .............................. G06K 7/10; G06K 7/14
[52] U.S. Cl. .................... 235/454; 235/455; 235/470; 235/474
[58] Field of Search ............................. 235/454, 455, 235/470, 474

[56] References Cited

U.S. PATENT DOCUMENTS 4,064,390 12/1977 Hildebrand .
4,483,615 11/1984 Bimringer .......................... 235/454 X
5,185,822  2/1993 Miura .

FOREIGN PATENT DOCUMENTS 907564  2/1980  U.S.S.R. .

OTHER PUBLICATIONS

JP 56–121182 A. In: Patents Abstracts of Japan, P094, Dec. 19, 1981, vol. 5, No. 201.

*Primary Examiner*—Harold Pitts
*Attorney, Agent, or Firm*—Townsend and Townsend and Crew

[57] ABSTRACT

A bar code reader for an article (17) which is moved at least substantially in one direction (26) has a scanner (12) which generates a scanning light beam (11) which scans a surface (18) of the article (17) linewise, a light receiving arrangement (13) which includes an electronic evaluation circuit (14) with which bar codes (16) applied to the surface of the article (17) and scanned by the light beam (11) can be recognized and which is arranged outside of the parth of movement (20) of the article (17) and directed towards the front surface (18) of the article (17) as seen in the direction of movement. A detection means (27, 28) for the location of the scanning surface (18) at which the scanning is to start, and optionally a detection means (29) for the speed of movement of the article (17) are connected to an electronic control and evaluation circuit (14) which acts on an advance means (30, 31) for the displacement of the scanning line (23) in such a way that the spacing of the scanner (12) from the scanning line (23) on the surface (18) of the article (17) remains at least substantially the same.

6 Claims, 3 Drawing Sheets

BAR CODE READER AND METHOD FOR ITS OPERATION

FIELD OF INVENTION

The invention relates to a method of operating a bar code reader and to a bar code reader for use in the method.

BRIEF DESCRIPTION OF THE PRIOR ART

Bar code readers of this kind are used in the conveying of items, for example, when conveying packages or articles of luggage on a conveyor belt, in order to recognise bar codes applied to the conveyed items and to be able to correspondingly further process the conveyed items. Such bar code readers are generally arranged alongside the path of movement of the conveyed items and no problem exists in scanning the side surfaces or the top surface of a conveyed item with a scanner.

As a result of the conveyor techniques which are customary nowadays it can however in many cases not be ensured, in particular when several codes are applied to the object, that the codes on the upper side and on the left and right sides of the subject are recognized. Accordingly codes must also be recognized when they are applied to the front and/or rear side of the conveyed articles.

Bar code readers in accordance with the prior art impart a double scanning movement to a scanning light beam directed onto the surface of the article in directions perpendicular to one another. This is done in such a way that a scanning light beam which is moved at high frequency of, for example, 1 kHz along a scanning line first detects a linear region on the scanning surface, with the so formed scanning line being slowly advanced, for example within 0.1 to 2 seconds, in a direction over the scanning surface lying perpendicular to the scanning line in such a way that each point of the scanning surface is detected at least once by the scanning light beam.

If now, in accordance with the prior art, the scanning light beam falls obliquely from the front or obliquely from the rear onto the front and/or rear scanning surface then the spacing between the scanner and the scanning surface changes during the scanning process. The scanning light beam focussed onto the scanning surface must thus have an adequate depth of focus so that with varying scanning distances an adequate sharpness of the scanning light bead on the scanning surface is always present. The generation of a scanning light beam with a large depth of focus however requires high optical complexity and cost, which are associated with with a comparatively voluminous layout of the scanner.

PRINCIPAL OBJECT OF THE INVENTION

The object of the present invention is to provide a further bar code reader and a further method for its operation. In particular the problem of the depth of focus of such a bar code reader when scanning the front and/or rear scanning surface of a moved article should be solved in a less complicated manner.

BRIEF DESCRIPTION OF THE INVENTION

In order to satisfy this object there is provided, in accordance with the present invention, a method of operating a bar code reader for codes applied to an article which moves at least substantially in one direction using a scanner which generates a scanning light beam which travels linewise along a scanning surface of the article, which has a light receiving arrangement with an electronic evaluation and control circuit with which bar codes on the scanning surface of the article and scanned by the scanning light beam can be recognized, and which is arranged outside of the path of movement of the article and directed onto the front or rear scanning surface of the article as seen in the direction of movement, characterised in that, with an article to be moved towards the scanner, the scanning light beam is directed before the start of the scanning, to the region of the scanning surface lying closest to the scanner and/or, with an article to be moved away from the scanner, to the region of the scanning surface which is furthest removed from the scanner; and in that the advance of the scanning line substantially perpendicular to the scanning direction which brings about the linewise scanning is synchronised with the speed of movement of the article in such a way that the spacing of the scanner from the scanning line on the scanning surface of the article remains at least substantially constant.

A preferred apparatus for carrying out the method comprises a scanner which generates a scanning light beam for linewise scanning of a scanning surface of the article, and which has a light receiver arrangement with an electronic evaluation circuit with which bar codes scanned by the light beam and applied to the scanning surface of the article can be recognized, the scanner being arranged outside of the path of movement of the article and the light beam being directed onto the front or rear scanning surface of the article as seen in the direction of movement, in particular for carrying out the method of claim 1, characterised in that there are provided a receiving means for the location of the scanning surface at which the scanning should start and an input or detection means for the speed of movement of the article, in that the receiving means and the input or detection means are connected to an electronic evaluation and control circuit; and in that the electronic evaluation and control circuit act on an advance means for the displacement of the scanning line in such a way that the spacing of the scanner from the scanning line on the scanning surface of the article remains at least substantially constant.

The concept underlying the invention is thus that the speed of movement of the conveyor carrying the articles and the speed of advance of the scanning line or the scanning surface, in particular of the scanning sector, are so matched to one another that the scanning line is located at least at substantially the same distance from the scanner at each phase of the scanning process. One can do away with a scanner having a large depth of focus, so that a scanner of simple optical layout is adequate for the purpose of the invention. The synchronisation of the conveying speed and of the speed of advance of the scanning line can take place in a simple manner by detecting the front or rear scanning surface of the article and realising the control of the scanning line advance in dependence on the speed of movement of the article.

Advantageous embodiments of the invention are characterised by the subordinate claims.

BRIEF LISTING OF THE FIGURES

The invention will be described in the following by way of example and with reference to the drawing in which are shown:

FIG. 1 a schematic perspective view of a conveying apparatus with an article arranged thereon and a bar code reader in accordance with the invention, with the front surface of the article being scanned, FIG. 2 a side view of a scanner used in the bar code reader of the invention in a purely schematic illustration not true to scale, FIG. 3 a schematic view of the scanner in accordance with line III—III in FIG. 2, FIG. 4 a perspective view analogous to FIG. 1, but with the conveying device being reversed and the rear surface of the articles being scanned, FIG. 5 a view similar to FIG. 1 in which the scanner is so arranged that the scanning takes place in a direction perpendicular to the scanning direction in FIG. 1.

FIG. 6 a view similar to FIG. 4 with the direction of scanning at the rear surface of the articles being perpendicular to the scanning direction of FIG. 4.

DESCRIPTION OF PREFERRED EMBODIMENTS

Figure 1:
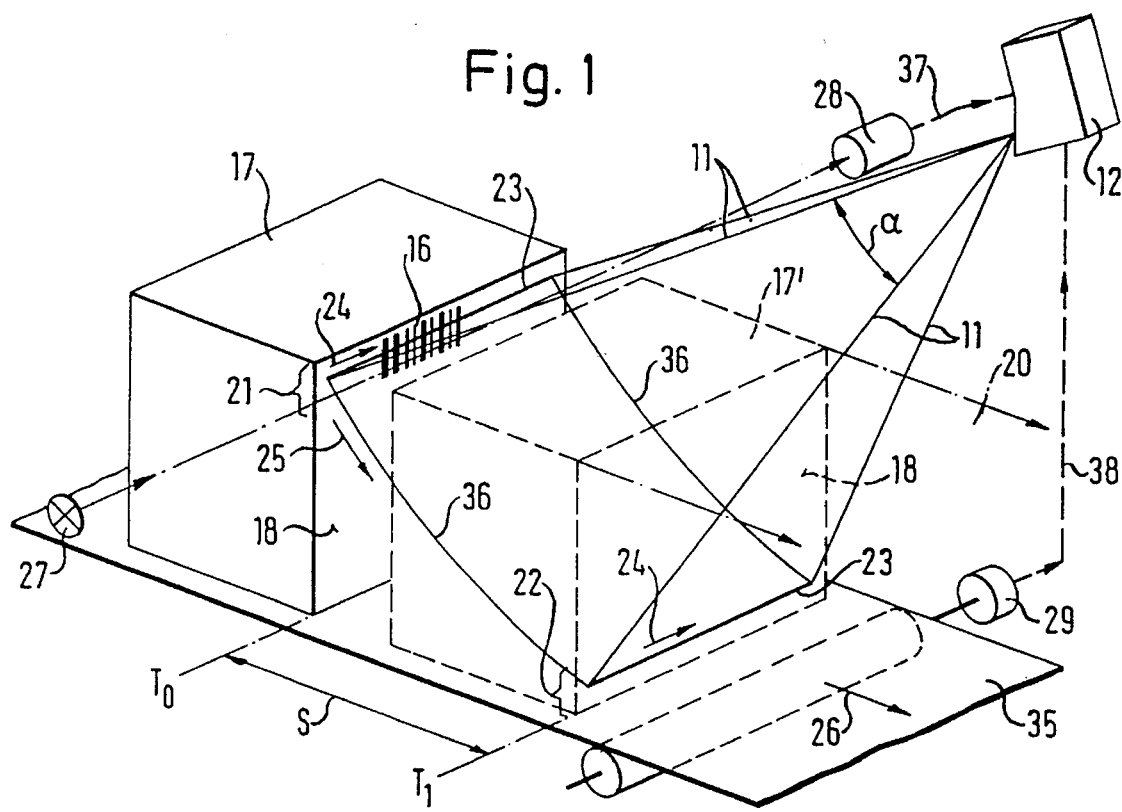

In accordance with FIG. 1 an article 17 is arranged on a conveyor belt 35 in order to be conveyed from the position shown in continuous lines in a direction of movement 26.

The same article is reproduced a second time at 17' after being advanced by a distance S.

A bar code which may for example be stuck-in place is located on the front surface 18 of the article 17 in the upper region and contains information which is for example important for later sorting of the article 17. It can for example be information concerning the destination of a package which has been handed in. In order that the package 17 can be correctly sorted later the information relating to the destination contained in the bar code 16 must be read and recognized by the sorting office.

For this purpose a scanner 12, preferably a scanner equipped with a laser, is arranged in front of the reading path S, above the path of movement 20 of the article 17, and transmits a scanning light beam 11 in the direction onto the front surface 18.

The scanning light beam 11 executes a scanning movement with a frequency of, for example, 1 kHz in the direction of the arrow 24 and thereby generates a scanning line 23 by the scanning light bead which moves over the front surface 18. In addition the scanning light beam 11 is deflected downwardly but with a substantially lower frequency of, for example, 0.1 to 2 Hz in the direction of the arrow 25 in such a way that the scanning line 23 is swung downwardly in the direction of the conveyor belt 35 and along the right cylindrical surface 36 which has its center in the scanner 12.

At the start of the reading path S a light barrier consisting of a light source 27 and a light receiver 28 is provided above the conveyor belt 35 and advises the scanner 12 via a control line 37 as soon as the front surface 18 of an article 17 enters into the reading path S at the time $T_0$.

In addition an incremental signal generator 29 is provided at the conveyor belt 35 and transmits a signal which is representative for the speed of movement 26 of the conveyor belt 35 to the scanner 12 via a further control line 38.

The method of the invention is such that after the light barrier 27, 28 as recognized the entry of the front surface 18 of the article 17 into the reading path S the laser scanner is controlled via the control line 37 so that the scanning line 23 is first located in the upper region 21 close to the front edge of the article 17. With increasing advance of the article 17 in the direction of the arrow 26 the scanning line 23 then pivots downwardly along the right cylindrical surface 36, controlled by the incremental signal generator 29 via the control line 38, until it has reached the lower region 22 in the vicinity of the front lower edge of the article 17 at the time T1 at which the scanning surface 18 has reached the rear end of reading path S. This state is indicated in FIG. 1 in broken lines at 17'.

In accordance with the invention the length of the reading path S is now so selected that the scanning line 23 is located at each phase of movement of the article 17 within the reading path S at substantially the same distance from the center of the scanning light beam 11 in the interior of the scanner 12. The scanning light bead which is located on the scanning line 23 and which is sharply imaged at the start of the reading path S in the upper region 21 of the article 17 thus also remains sharp during the entire advance movement in the direction of the arrow 25 downwardly, even when the depth of focus of the image of the scanning light bead is minimal. In other words, through a suitable choice of the length of the reading path S and also of the speed of advance of the scanning line 23 in the direction of the arrow 25 attention is paid in accordance with the invention to ensuring that the distance of the scanning light beam 11 from the center of the scanning movement within the laser scanner 12 up to the front surface 18 of the moved article 17 remains at least substantially constant.

Figure 2:
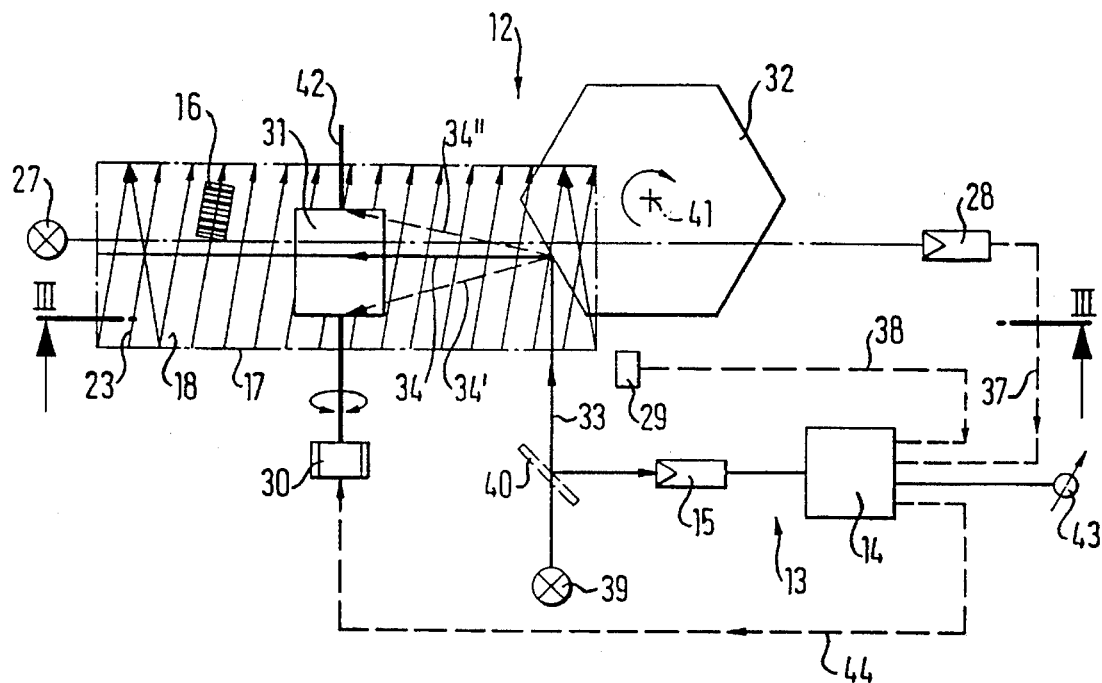
Figure 3:
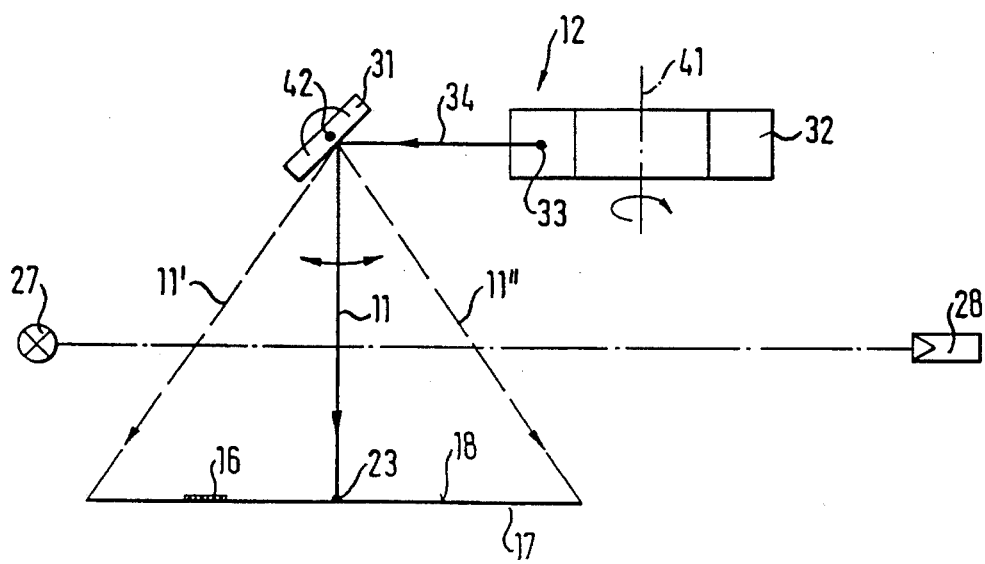

A practical embodiment of the scanner 12 of FIG. 1 is schematically illustrated in the FIGS. 2 and 3.

A sharply bundled light beam 33, which is for example generated from a laser 39 via a non-illustrated optical system, extends through a semi-permeable mirror 40 to a mirror wheel 32 which is driven to execute a continuous rotary movement in the direction of the arrow about its axis 41. The light beam 33 is deflected at one of the facets of the mirror wheel through, for example, 90° in order to pass, as a reflected light beam 34 onto an elongate pivotal mirror 31 the length of which is sufficiently large that the entire scanning range of the deflected light beam 34 which is bounded by the two broken lines 34', 34" is picked up.

The pivotal mirror 31 deflects the reflected light beam 34 once again and indeed in the direction onto the front scanning surface 18 of the article 17 where the bar code 16 is applied.

A drive 30 causes the pivotal mirror 31 to execute a to and fro movement, i.e. an oscillatory movement, in the direction of the double arrow about a pivot axis 42 extending in the direction of its longitudinal axis. In this way the scanning light beam 11 which is thrown by the oscillatory mirror 31 onto the front surface 18 is pivoted to and fro in an angular range from 11' to 11" which is shown in broken lines in FIG. 3.

The light reflected from the front surface 18 of the article 17 is for example thrown back in autocollimation via the pivotal mirror 31 and the mirror wheel 32 to the partly permeable mirror 40 and deflected by the latter onto a photoreceiver 15 which is connected to an electronic evaluation and control circuit. The photoreceiver 15 and the electronic evaluation and control circuit 14 jointly form a signal processing arrangement 13 which recognises the content of the bar code and transmits it to an apparatus which is only schematically illustrated at 43.

The output signal of the light barrier 27, 28 is also supplied to the electronic evaluation and control circuit 14 via the control line 37 and the output signal of the incremental signal generator 29 is also supplied to the electronic control and evaluation circuit 14 via the control line 38. The electronic evaluation and control circuit 14 acts on the drive unit 30 of the pivotal mirror 31 via a control line 44.

In so far as the speed of advance of the conveyor belt 35 is constant it is possible to do away with the incremental signal generator 29 and instead of this to input a fixed value corresponding to the known speed of advance into the electronic evaluation and control circuit 14.

As a result of this design the pivotal oscillating mirror 31 starts its movement in the region 21 of the article 17 (FIG. 1) which brings about the advance of the scanning line 23 along the right cylindrical surface 36 as soon as the light barrier 27, 28 has recognized the entry of the front surface 18 into the reading path S. The electronic evaluation and control circuit 14 is then caused, via the incremental transducer 29, to drive the drive 30 for the pivotal mirror 31 via the control line 44 so that the distance of the scanning light beam 11 from the front surface 18 remains substantially constant during the advance in the direction of the arrow 25. In this way the photoreceiver 15 receives a problemfree bar code signal which can then be reliably evaluated and recognized in the attached electronic evaluation and control circuit 14, as a result of the scanning light bead which remains sharp during the scanning.

It is, moreover, important for a reliable recognition of codes arranged on the front surface 18, that the angle α drawn in in FIG. 1 through which the scanning line 23 is downwardly pivoted is sufficiently large that the pivotal region extends from the upper region 21 to the lower region 22 of the front surface 18.

Figure 4:
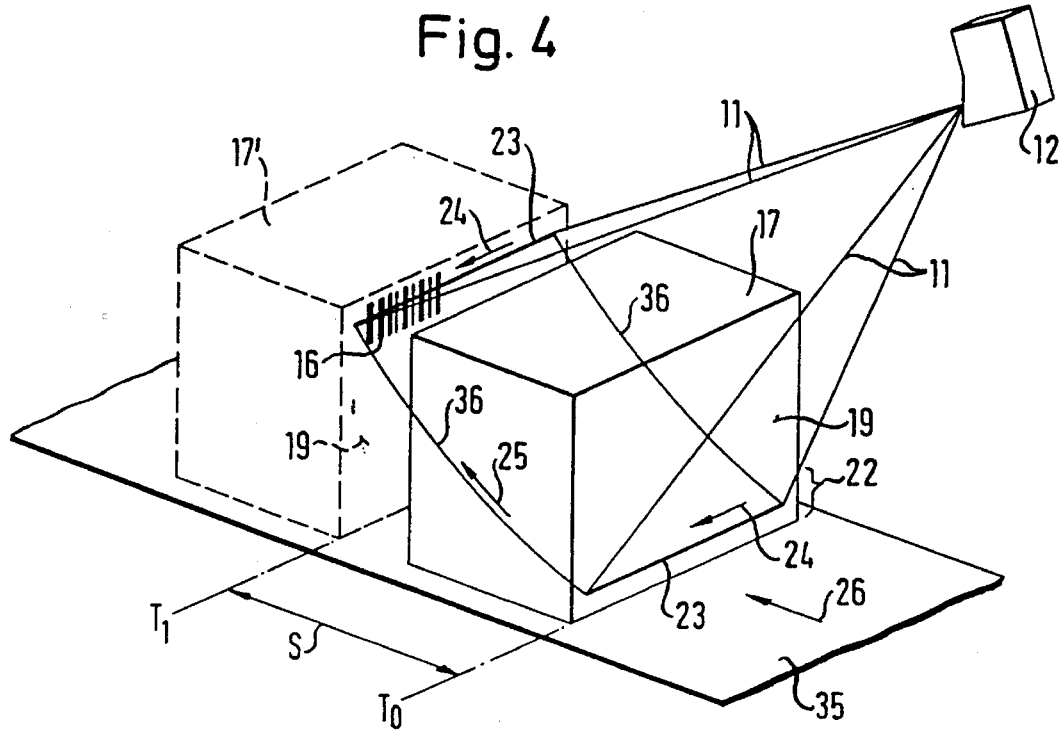
Figure 5:
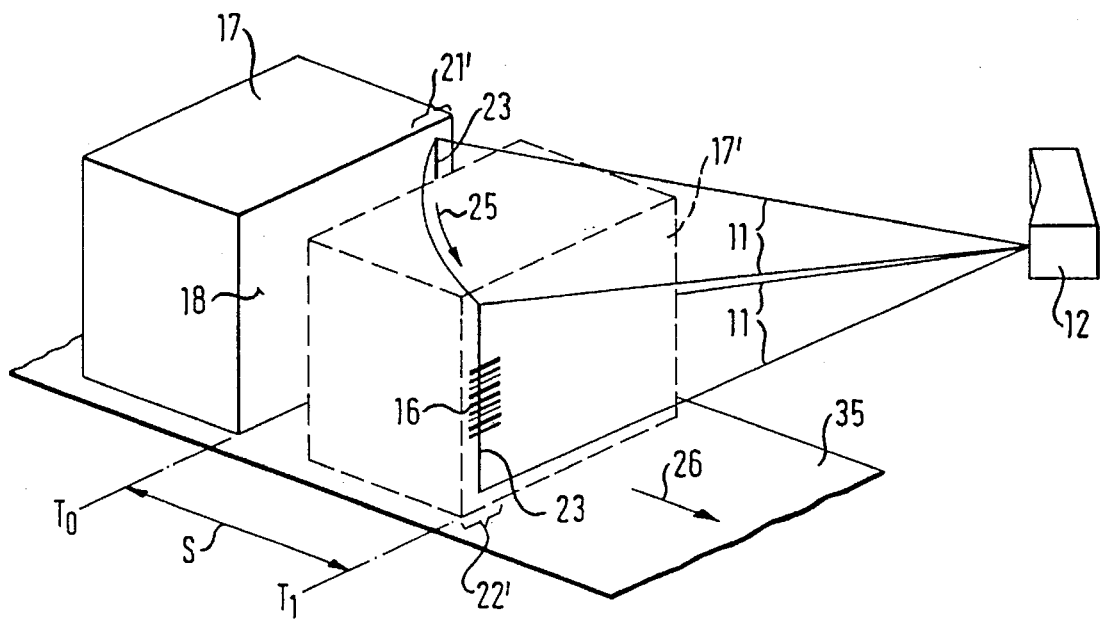
Figure 6:
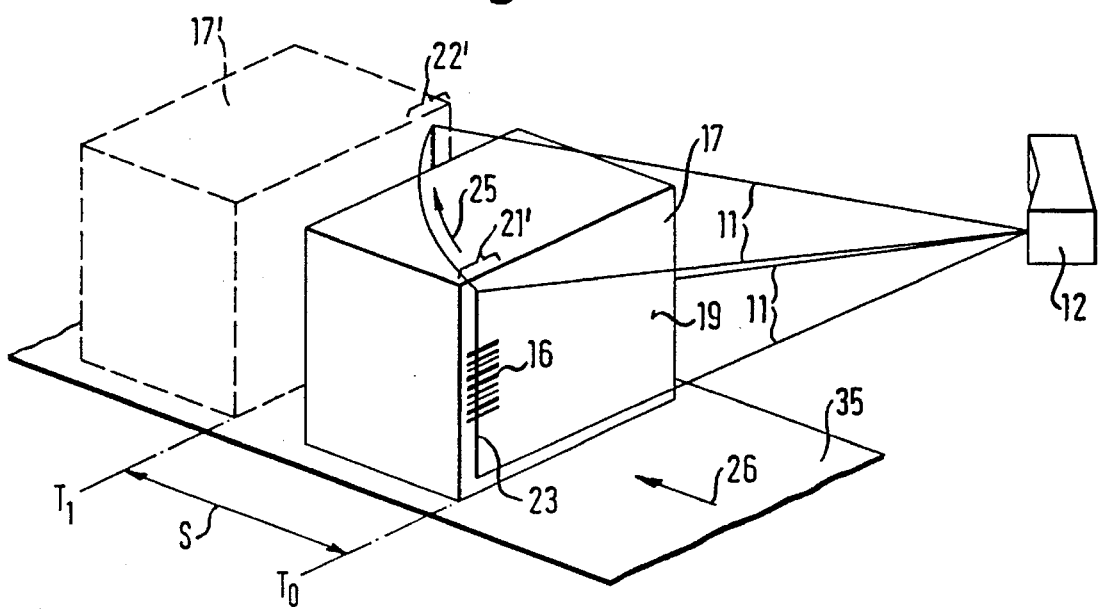

In FIGS. 4 to 6 the same reference numerals designate corresponding parts to those having the same reference numerals in FIGS. 1 and 2. In FIGS. 4 to 6 however not all of the components which are reproduced in FIG. 1 are shown, they are however present in the same manner as in the embodiment of FIG. 1.

In the embodiment of FIG. 4 the direction of movement 26 of the conveyor belt 35 is reversed in such a way that the scanner now scans the rear surface 19 of the article 17. With such a scanning arrangement the scanning line 23 is moved downwardly at the time $T_0$ at the start of the reading path S and then pivots in the direction of the arrow 25 upwardly along the right cylindrical surface 36 with the speed predetermined in accordance with the invention.

In other respects the manner of operation of the embodiment of FIG. 4 is the same as that of FIG. 1.

In the embodiment of FIG. 5 the direction of movement 26 of the articles is again the same as in FIG. 1. In this case the front surface 18 of the article 17 is again scanned, however the scanning line 23 now stands perpendicular to the direction of the scanning line 23 of FIG. 1 and consequently the direction of advance 25 for the scanning line 23 takes place in the lateral direction. The region 21' where the scanning starts is thus located, as seen in the direction of conveying, at the front left edge of the article 17 whereas the end region 22' of the scanning is located in a region of the front right hand edge of the articles.

It is particularly preferred if the two scanning processes of FIGS. 1 and 5 are combined, because in this manner bar codes 16 arranged in any desired direction can be reliably recognized.

This embodiment of FIG. 6 corresponds largely to that of FIG. 4, however, in analogy to FIG. 5, a lateral advance movement of the scanning line 23 takes place from an initial region 21' at the rear left hand edge of the article 17 to a region 22' at the rear right hand edge of the article 17.

In order to detect bar codes 16 which can be aligned in any desired manner the scanning arrangements of FIGS. 4 and 6 which stand at right angles to one another are preferably combined. It is also possible, depending on the shape and application of the bar code 16 to arrange for example three scanners at respective angles of 60°.

The alignment of the scanning lines 23 to one side edge of the article 17, which is preferably shaped as a parallelepipedon, is preferred, however other directions of the scanning line 23, for example in the diagonal direction are fundamentally possible. If two scans are used simultaneously then these should in any event take place perpendicular to one another.

We claim:

1. Method of operating a bar code reader for codes (16) applied to an article (17) which moves at least substantially in one direction (26) using a scanner (12) which generates a scanning light beam (11) which travels linewise along a scanning surface (18, 19) of the article (17), which has a light receiving arrangement (13) with an electronic evaluation and control circuit (14) with which bar codes (16) on the scanning surface (18, 19) of the article (17) and scanned by the scanning light beam (11) can be recognized, and which is arranged outside of the path of movement (20) of the article (17) and directed onto the front or rear scanning surface (18, 19) of the article (17) as seen in the direction of movement, characterised in that, with an article (17) to be moved towards the scanner (12), the scanning light beam (11) is directed before the start of the scanning, to the region (21) of the scanning surface (18) lying closest to the scanner (12) and/or, with an article (17) to be moved away from the scanner (12), to the region (22) of the scanning surface (19) which is furthest removed from the scanner (12); and in that the advance (25) of the scanning line (22) substantially perpendicular to the scanning direction which brings about the linewise scanning is synchronised with the speed of movement of the article (17) in such a way that the spacing of the scanner (12) from the scanning line (23) on the scanning surface (18, 19) of the article (17) remains at least substantially constant.

2. Method in accordance with claim 1, characterised in that the scanning line (23) extends horizontally or vertically and its advance (25) correspondingly extends vertically or horizontally respectively.

3. Method in accordance with claim 1, characterised in that two scanners (12) are used, the scanning lines (23) of which stand at least substantially perpendicular to one another.

4. Method in accordance with claim 1, characterised in that three or more scanners (12) are used, the scanning lines (23) of which extend at least substantially at an angle of 60° or at smaller angles to each other.

5. Bar code reader for codes (16) applied to an article (17) moved at least substantially in one direction (26), the reader comprising a scanner (12) which generates a scanning light beam (11) for linewise scanning of a scanning surface (18, 19) of the article (17), and which has a light receiver arrangement (13) with an electronic evaluation circuit (14) with which bar codes (16) scanned by the light beam (11) and applied to the scanning surface (18, 19) of the article (17) can be recognized, the scanner (12) being arranged outside of the path of movement (20) of the article (17) and the light beam being directed onto the front or rear scanning surface (18, 19) of the article (17) as seen in the direction of movement, characterised in that there are provided a receiving means (27, 28) for the location of the scanning surface (18, 19) at which the scanning should start and an input or detection means (29) for the speed of movement of the article (17), in that the receiving means (27, 28) and the input or detection means (29) are connected to an electronic evaluation and control circuit (14); and in that the electronic evaluation and control circuit (14) act on an advance means (30, 31) for the displacement of the scanning line (23) in such a way that the spacing of the scanner (12) from the scanning line (23) on the scanning surface (18, 19) of the article (17) remains at least substantially constant.

6. Apparatus in accordance with claim 5, characterised in that the scanner (12) includes a light deflecting means (32), in particular a mirror wheel (32), which is illuminated by a light beam (33) and generates the scanning movement, and a light beam pivoting means, in particular a pivotal mirror (31), which picks up the light beam reflected by the light deflecting means (32) and generates the advance (25), with the light beam pivoting means directing the light onto the scanning surface (18, 19) and forming the scanning line (23) at the location determined by the electronic evaluation and control circuit (14).

\* \* \* \* \*